United States Patent [19]

Shelley et al.

[11] 4,344,753

[45] Aug. 17, 1982

[54] METHOD FOR REDUCING THE THERMAL INERTIA OF A FURNACE OR OVEN WALL AND INSULATED WALL PRODUCED THEREBY

[75] Inventors: Stanley J. Shelley, Dewsbury; Harold G. Emblem, Mirfield, both of England

[73] Assignee: Clinotherm Limited, Dewsbury, England

[21] Appl. No.: 192,655

[22] Filed: Oct. 1, 1980

[51] Int. Cl.$^3$ .......................... F27D 1/16; F27D 1/00; B32B 1/04

[52] U.S. Cl. ........................................ 432/3; 110/336; 428/74; 428/920; 432/247

[58] Field of Search .................... 432/3, 247; 110/336; 428/920, 74, 76, 114

[56] References Cited

U.S. PATENT DOCUMENTS

| | | | |
|---|---|---|---|
| 3,940,244 | 2/1976 | Sauder et al. | 110/336 |
| 4,086,737 | 5/1978 | Byrd, Jr. | 52/227 |
| 4,194,036 | 3/1980 | Davis et al. | 428/74 |
| 4,238,257 | 12/1980 | Remi et al. | 428/920 |

*Primary Examiner*—John J. Camby
*Attorney, Agent, or Firm*—Felfe & Lynch

[57] ABSTRACT

The invention relates to the insulating of furnace walls with a double layer of insulating modules of the type having refractory fibers disposed end on to the oven wall when disposed in place. The modules are first compressed and held that way with easily combustible material and the compression released during the firing of the furnace to destroy the wrapping material. The first layer is preferably non-aligned with the second layer to limit the loss of insulation due to aligned seams.

9 Claims, 7 Drawing Figures

METHOD FOR REDUCING THE THERMAL INERTIA OF A FURNACE OR OVEN WALL AND INSULATED WALL PRODUCED THEREBY

BACKGROUND OF THE INVENTION

The present invention relates to the insulation of furnace walls and the insulated furnace wall produced by the method. It represents an improvement over known methods and most particularly over the method for reducing the thermal inertia of furnace or oven walls described in U.S. Pat. No. 4,194,036 issued Mar. 18, 1980. The present invention utilizes insulating modules in a new method to produce a new and improved insulated furnace wall.

In general, the present invention involves the insulation of furnace walls by applying a dual layer insulation. The first layer of insulation, which is to be applied to the furnace wall has much less rigorous requirements with respect to its resistance to thermal decomposition, as the second layer is applied thereover to reduce its exposure. The second layer of insulation is applied over the first layer of insulation and is exposed to the full furnace operating temperatures. It is for this layer that a unique insulating module of the type disclosed in U.S. Pat. No. 4,194,039 noted above, is to be used to give the resulting wall its unique insulating characteristics. In addition, as furnace insulation is generally applied in modular form, the second layer can be applied in an offset manner with respect to the seams of the first layer of insulation. This reduces leakage of both gases and heat through the insulating layer.

A two-layer heat insulating liner for furnace construction, wherein the second layer of insulation is generally disposed in non-alignment with the seams of the first layer of insulation, is disclosed in British Pat. No. 1,555,459, published Nov. 7, 1979. However, the insulating module used in the present invention is not described in this patent.

The insulation of ovens and furnaces using modules of refractory fibers disposed substantially end-on to the wall of the furnace, has been practiced for a long time. Thus, for example, U.S. Pat. No. 4,194,036 discloses a module and method of use, similar to that which is employed in the practice of the present invention. However, this patent is directed to only a single layer of modules.

Another type of module for use in insulating furnaces or ovens is disclosed in U.S. Pat. No. 3,930,916, issued Jan. 6, 1976. Shown is a composite module wherein the hot face is formed of insulating fibers secured end on to a layer of vermiculite block which, in turn, is bolted to a steel sheet for use in an oven. Individual modules are secured to the oven wall.

Other patents which describe various insulating modules for attachment to oven walls or the like include U.S. Pat. No. 3,819,468 to Sauder et al; U.S. Pat. No. 3,993,237 to Sauder et al.; and U.S. Pat. No. 3,940,244 to Sauder et al. These are related applications which U.S. Pat. No. 3,940,244 is particularly concerned with a dual layer module to be applied to a furnace wall.

SUMMARY OF THE INVENTION

The present invention provides a method whereby a dual layer of insulation is applied to a furnace or oven wall. The first layer is applied to the wall and the second layer applied thereover, preferably secured to the face of the first layer by a refractory binder.

The first layer may be of less costly fiber because the second layer protects it from the full intensity of the heat of the furnace. When the second layer is secured to the face of the first layer, the first layer should have sufficient mechanical strength to support the weight. Otherwise it may be necessary to use a stud anchor system supporting an expanded metal grid or other means to help the first layer support the weight of the second layer.

For the most high temperature uses, it is contemplated that the first layer will be formed of end-on fiber type modules and preferably of the same type of modules that the second layer is formed. In this case, the second layer is applied with the modules in non-alignment with the first layer so that the seams between the modules will not line up and escape of gases is greatly retarded.

The end-on fiber module for the second layer (and preferably also for the first layer) is of a type wherein the refractory fibers are essentially all disposed end-on to one end of the module, elastically compressed and held in elastic compression by a wrapping material which is thermally decomposed. The first layer is installed and thereafter the second layer cemented thereto. When the oven is fired, the thermally combustible wrapping material is destroyed and the modules allowed to expand to tightly seal and insulate the wall of the oven.

In some applications, the second layer can be applied directly over a previously applied first layer without removing the first layer, as when it becomes necessary to upgrade the insulation of a furnace which has been in operation for some time.

DESCRIPTION OF THE PREFERRED EMBODIMENT

Figure 1:
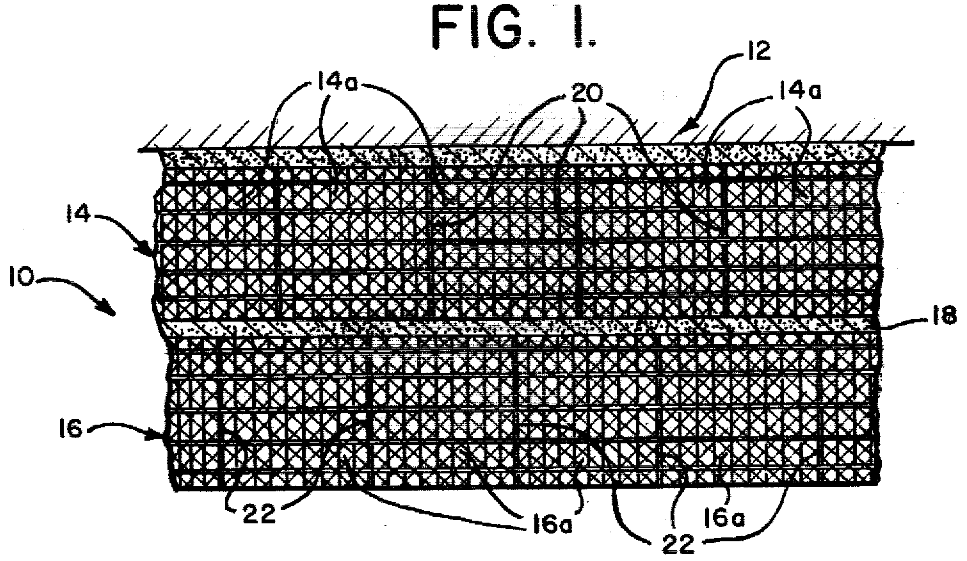
FIG. 1 shows the wall of a furnace on which has been applied a dual layer of insulation wherein both layers are formed of the same modules.

With reference to FIG. 1, the present invention insulation 10 is shown applied to a furnace wall 12. The insulation 10 comprises a first layer of insulating fibers 14 secured directly to the wall 12, and a second layer of insulating fibers 16, overlaying the first layer 14.

In the embodiment of FIG. 1, the second layer 16 is bonded directly to the face of the first layer 14 with a cement layer 18. The first layer 14 is preferably composed of modules of insulating refractory fibers **14*a* disposed in abutment with each other, having seams 20 formed therebetween. The second layer 16 is also formed of modules of insulating refractory fibers 16*a* with seams 22 therebetween. The second layer 16 is applied so that the seams 22 are non-aligned with the seams 20 in the first layer 14**. This provides for a tighter heat seal and restrains the passage of gases through the insulation.

The embodiment of FIGS. 2 and 4–6 is similar to the embodiment of FIG. 1 in that the insulation of 24*a* is formed of a first and second layer (26, 16). However, the second layer 16 is mounted on an expanded metal sheet anchors 26, secured to furnace wall 12 by stud anchors 28. The expanded metal sheet anchors 26, or other equivalent support, permit mounting the second layer 16 over the first layer 26 which may not have the physical strength to support the second layer 16. This allows a less costly fiber such as mineral wool slabs to be used for the first layer 26. Also, this allows the second layer 16 to be mounted over a prior installed first layer which may have deteriorated from use or otherwise, to upgrade the insulation in a furnace with a minimum of down time.

Figure 3A:
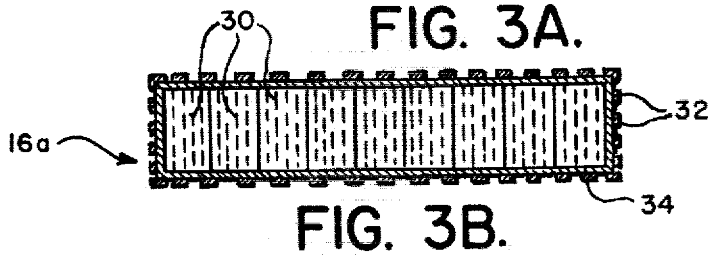
FIGS. 3A and 3B show a module of the preferred type for use in the present invention.
Figure 3B:
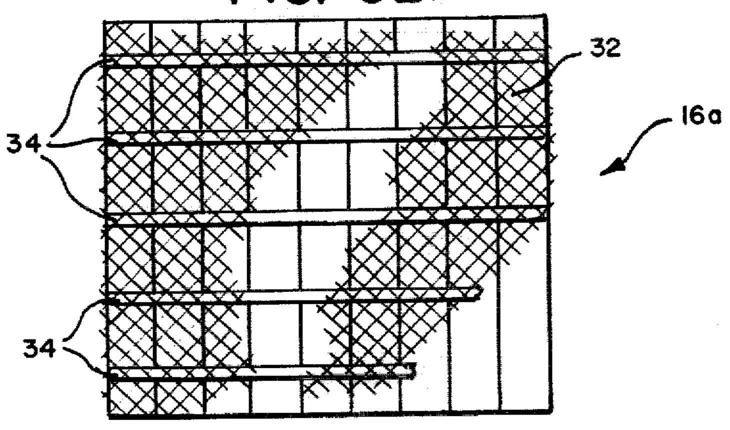
Figure 4:
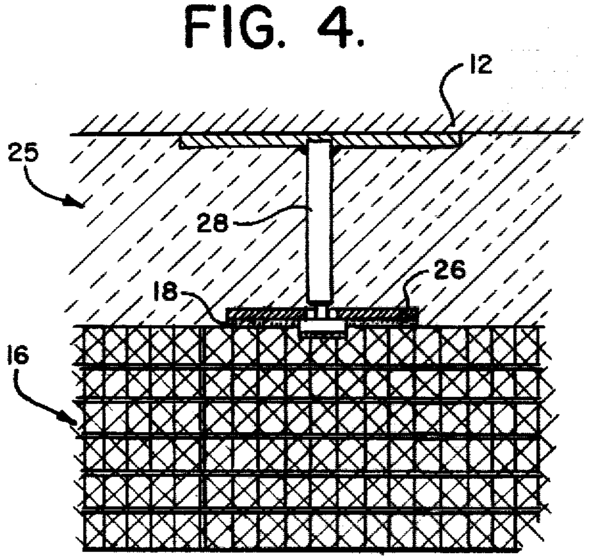
FIG. 4 shows a section through 4—4 of FIG. 2 showing the anchor for the second layer, in detail.

The preferred module 16*a* for at least the second layer 16 is illustrated in detail in FIG. 3. The module 16*a* is typically a biscuit of substantially aligned end-on oriented fibers 30 held compressed tightly together by a netting 32 and/or strips 34, or other thermally decomposable enclosing material. The modules disclosed in U.S. Pat. No. 4,194,036 are the type of modules suitable for this use.

Once the modules 16 are in place, firing the furnace will cause the thermally decomposable compression means to be destroyed, permitting the modules to expand to form a tight seal. Because of the physical strength of such a structure, it is preferred that the same module 16*a* be used for the first layer 14 as well, especially when the second layer 16 is to be secured directly thereto with cement 18 or other suitable adhesive.

In FIG. 1, the furnace can be fired before applying the second layer of modules which will permit the modules of the first layer to expand before applying and firing the second layer of modules. Alternatively, the second layer of modules can be applied to the first layer without firing the first layer.

Figure 6:
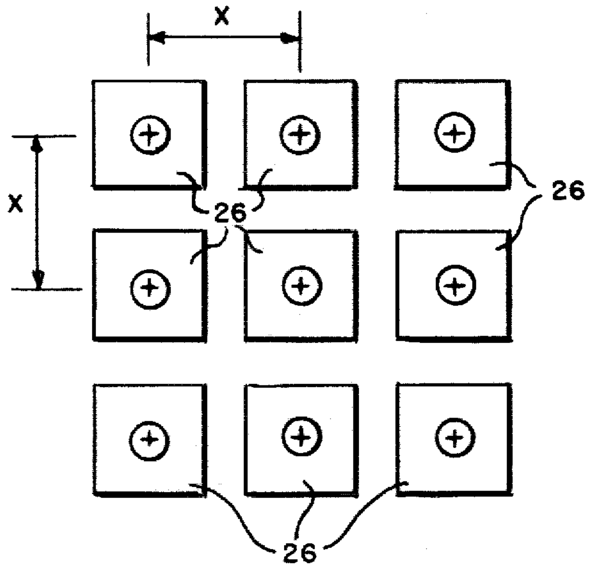
FIG. 6 is a schematic array of anchors showing the spacing therebetween.

The technique for applying a dual layer of insulation 24*a* using stud anchors 28 will normally comprise an initial step of laying out and welding the stud anchors 28 to the furnace wall 12 in an array such as is schematically illustrated in FIG. 6. When expanded metal sheet anchors 26 of about 6 inches by 6 inches square are used, the centers are normally spaced (dimension x in FIG. 6) about 10" or 12" apart. Wider spacing about 12" is used when the furnace walls 12 are flat vertical surfaces, while narrower spacing (about 10") is used for curved or horizontal (ceiling) walls.

Figure 2:
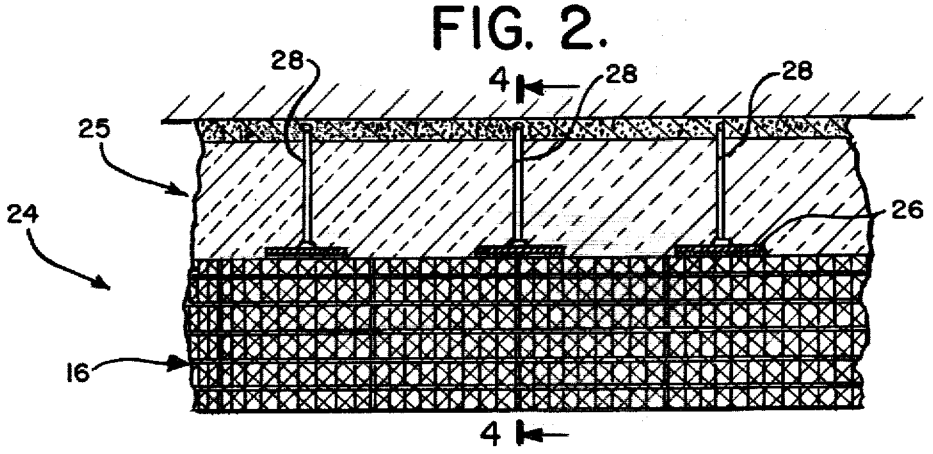
FIG. 2 shows a furnace wall with a dual layer of insulation wherein the two layers are different, and before destruction of the thermal wrapping material.
Figure 5:
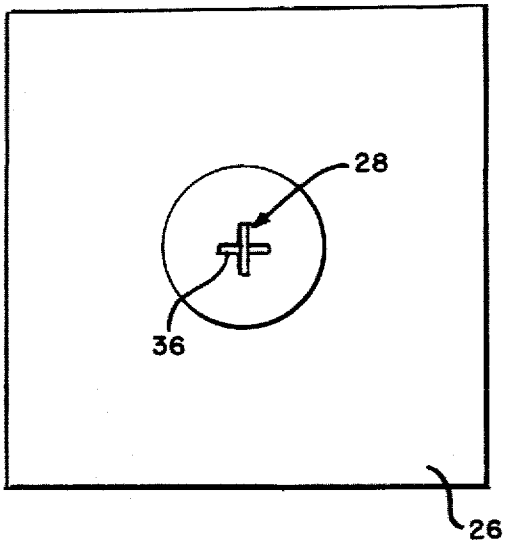
FIG. 5 shows a detail of the twist lock arrangement for anchoring the first layer to the furnace wall as shown in FIG. 2.

Thereafter, mineral wool slabs are impaled on the stud anchors 28 to form the first layer 25 as shown in FIG. 2. Usual care should be taken to be sure the joints between the slabs are tight. The slabs are held in place by securing expanded metal anchors 26 to the end of stud anchors 28. FIG. 5 shows a suitable twist lock arrangement for this, comprising a slot in the metal anchor 26 through which the end of slab anchor 28 can pass and be locked by twisting.

A coating of cement 18 is applied to the interface. The metal anchors 26 should be well coated, but it is not essential that the exposed mineral wool surface be completely covered. The cement coat should be allowed to dry out (partially or completely) and warming from the shell or wall 12 side—e.g. by a gas torch—is beneficial.

After a minimum of two hours, when drying out has occurred to a satisfactory degree, the second layer may be applied in a usual manner, and furnaces may be fired immediately on completion of the second layer.

If desired for increased insulation properties or other considerations, three or more layers of insulation can be used. This can be formed by either of the two methods described hereinabove, depending on the refractory modules used. That is, the layers can be supported by stud anchors or can be cemented one on top of the other.

It is noted that cementing the first layer to the furnace wall is most preferred. This results in a monolithic structure formed of the wall, the cement layer, and a thin surface layer of the insulating module. Thus, gases cannot easily get between the insulating module and wall to deteriorate the bond therebetween.

The above is illustrative of presently preferred embodiments and not intended to be otherwise limiting.

What is claimed is:

1. In a method for reducing the thermal inertia of a furnace or oven wall by application of insulating material modules, the steps comprising (a) applying a first insulating layer in the form of a fiber mat having a first usable temperature range to the wall;

(b) compressing a plurality of second insulating modules of refractory fibers having a second usable temperature range greater than said first temperature range and disposed with one end "end-on" to the plane of one end of the second modules, by wrapping the second modules in thermally combustible materials;

(c) applying the second modules in side-by-side relation to each other over the first insulating layer; and (d) firing the furnace or oven to thermally destroy the wrapping material and release the modules from compression thereby causing each module to expand and press against adjacent modules to tightly close the seams therebetween.

2. The method of claim 1 wherein the first insulating layer comprises a series of first insulating modules disposed side by side whereby the first insulating layer is formed with seams between the first modules.

3. The method of claim 1 or 2 wherein the steps of applying the second modules includes securing the second modules to the face of the first insulating layer with a refractory binder material.

4. The method of claim 2 wherein the step of applying the second modules includes disposing the second modules to cover substantially the seams in the first insulating layer, whereby the seams between the second modules are non-aligned with the seams in the first insulating layer.

5. The method of claim 1 wherein the step of applying the first insulating modules to the wall comprises compressing a plurality of the first insulating modules, formed of refractory fibers disposed with one end, "end-on" to the plane of one end of the first modules, by wrapping the first modules in thermally combustible material; and applying the first modules in side by side relation to each other on the wall.

6. In a furnace or oven, an insulating layer secured to the walls for reducing the thermal inertia thereof, comprising a first insulating layer having a first usable temperature range;

a second insulating layer having a second usable temperature range higher than said first temperature range secured to the first insulating layer and comprising modules of the typed formed with refractory fibers disposed with one end "end-on" to the plane of one end of the module, the module being further composed of a wrapping of thermally combustible material holding the fibers in elastic compression whereby when said wrapping is thermally destroyed, the module is free to expand.

7. In the furnace or oven of claim 6, said first insulating layer comprising a plurality of first layer modules laid side by side to form said first insulating layer with seams between the first insulating modules; and said second insulating layer modules being disposed in substantial non-alignment with the seams of said first layer modules.

8. In the furnace of claim 6 or 7, said first insulating layer being formed of first insulating layer modules composed of refractory fibers disposed with one end "end-on" to the plane of one end of the first layer modules and being held in elastic compression by a wrapping of thermally combustible material.

9. In a furnace of claim 8 wherein said second layer modules are secured to the face of said first layer modules by a refractory binder.

* * * * *